United States Patent [19]

Anderson et al.

[11] 4,101,953
[45] Jul. 18, 1978

[54] MULTIPLE FLASHLAMP ARRAY

[75] Inventors: Robert M. Anderson, Pepper Pike; James M. Hanson, Euclid, both of Ohio

[73] Assignee: General Electric Company, Schenectady, N.Y.

[21] Appl. No.: 765,455

[22] Filed: Feb. 3, 1977

Related U.S. Application Data

[63] Continuation of Ser. No. 506,953, Sep. 18, 1974, abandoned.

[51] Int. Cl.² ............................................. G03B 15/02
[52] U.S. Cl. ....................................... 362/11; 362/227
[58] Field of Search .................. 240/1.3; 362/11, 227, 362/249

[56] References Cited

U.S. PATENT DOCUMENTS 3,956,625   5/1976   Anderson .............................. 240/1.3

*Primary Examiner*—Stephen J. Lechert, Jr.
*Attorney, Agent, or Firm*—John F. McDevitt; Lawrence R. Kempton; Frank L. Neuhauser

[57] ABSTRACT

A multiple photoflash lamp array is disclosed capable of producing a plurality of flashes for taking a plurality of flash pictures. The particular lamp construction includes a reflective unit having a plurality of adjacent reflectors or reflector cavities, each having a photoflash lamp mounted therein on a common base having a rigid molded plastic cover or shield which is light transmitting secured to said base and holding the entire assembly together. A butadiene styrene polymer is employed as the material of construction for said light transmitting cover means to provide better protection against shattering when the lamps are flashed than is obtained with the styrene homopolymer material now being used.

4 Claims, 3 Drawing Figures

MULTIPLE FLASHLAMP ARRAY

This is a continuation of application Ser. No. 506,953, filed Sept. 18, 1974 now abandoned.

BACKGROUND OF THE INVENTION

Multilamp photoflash arrays or assemblies comprised of a reflector unit having a plurality of adjacent reflectors or reflector cavities, each having a photoflash lamp mounted therein are well known in the art. The conventional flashcube is one well known embodiment of such photoflash lamp arrays and an example of a flashcube is described in U.S. Pat. No. 3,739,166 to R. M. Anderson. Various type linear or planar photoflash lamp arrays are also well known in the art wherein a series of reflectors are arranged in one or more rows which may face in the same direction to form a single-sided array or in opposite directions to form a two-sided array. An example of such two-sided array is described in U.S. Pat. No. 3,598,984 whereas such single-sided array is described in a U.S. patent application entitled "Multiple Flashlamp Unit" of K. H. Weber, Ser. No. 448,671, filed Oct. 22, 1973, and assigned to the assignee of the present invention. The protective covers or shields of all these multiple photoflash arrays are in the form of a rigid molding of a suitable thermoplastic resin such as cellulosic or polystyrene having four or more sidewalls, a top wall, and an open bottom through which the reflector unit is inserted. These rigid molded plastic covers or shields are customarily affixed around their bottom edge to the base support element of the array by suitable means, as for example, by adhesive, heat-sealing, ultrasonic welding, or a mechanical snap. Also, it is known to increase the containment strength of such molded plastic covers against the destructive force of a possible lamp rupture by means of one or more thin strips of light-transmitting plastic material either adhesively bonded or shrink fitted tightly around the molded plastic cover or by using an insert within the cover.

SUMMARY OF THE INVENTION

Objects of the present invention are to provide improved cover means for a multilamp photoflash array which can be formed as feasibly as the plastic materials now being used and which better contains the debris created from a lamp inadvertently rupturing when the lamps are flashed.

The invention comprises, briefly, and in one preferred embodiment, a multilamp photoflash array having a rigid plastic cover formed with a particular type of butadiene styrene copolymer material exhibiting both higher mechanical impact strength and elasticity or elongation than is generally obtainable with the currently used styrene homopolymer materiel. The softening point of the butadiene styrene copolymer material selected helps preserve integrity of the cover means since significant heating is produced when the lamps are flashed and a Vicat softening point of approximately 200° F has been found to provide the improved containment. A commercially available form of the improved butadiene styrene copolymer material is marketed by the Phillips Petroleum Company as "KRO3 Resin" to specifications of 90–95% light transmission, and Izod impact strength of 0.4 foot-pounds/inch notch (0.125 inch specimen thickness), a modulus of elasticity of 200,000 psi, and a 100% elongation at a tensile pull rate of 0.2 inches/minute. This copolymer material is further described along with its method of preparation in U.S. Pat. No. 3,639,517 to A. G. Kitchen et al as the reaction product of monovinyl-substituted aromatic hydrocarbons and conjugated dienes which have been sequentially polymerized with multiple additions of initiator and monovinyl substituted aromatic monomer and subsequently treated with a polyfunctional treating agent to form resinous branched block copolymers which are polymodal in regard to molecular weight distribution.

DESCRIPTION OF THE PREFERRED EMBODIMENTS

Figure 1:
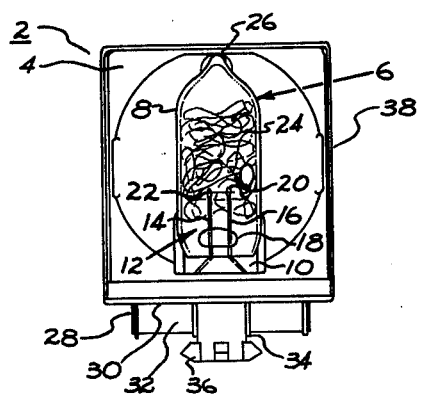
FIG. 1 is an elevation of a flashcube type multilamp photoflash array having a protective plastic cover according to the present invention.

In FIG. 1, an array of four photoflash lamps with associated flashlamp-reflector assemblies 2 are mounted adjacent to one another with adjacent devices being mounted at right angles to each other and with their reflectors 4 facing outwardly to form four sides of a cube. Each flshlamp-reflector unit or assembly is comprised of a miniature size flashlamp 6, such as that commonly referred to as an AG type flashlamp, mounted within the innermost part of the associated reflector 4 which, as is customary, is of generally parabolic curvature. As shown, the flashlamp 6 is comprised of a tubular shaped light-transmitting hermeticallly sealed glass envelope 8 which is formed at one end with an external flattened pressed seal portion 10. Sealed into the envelope 8 is a lamp mounted structure 12 comprised of a pair of lead-in wires 14–16 which are fixedly supported in spaced side by side relation by a glass bead 18 fused therearound. The lead-in wires 14–16 are sealed through the flattened pressed seal 10 and extend outwardly in an end-wise direction therefrom. An ignition filament 20 of tungsten or a tungsten-rhenium alloy is mounted within the envelope 8, the filament being connected across the inner ends of the lead-in wires 14–16. Coatings 22 of a suitable primer material such as an admixture of zirconium, magnesium and potassium perchlorate powders bonded together by a binder such as nitrocellulose, are provided on the inner tips of the lead-in wire 14–16 and on at least the opposite end portions of the filament 20 where it connects with the lead-in wires. The envelope 8 contains a loosely distributed quantity 24 of a suitable light-producing filamentary combustible material such as, for example, a shredded foil of zirconium, aluminum or hafnium, together with a filling of a combustion-supporting gas such as oxygen at super atmospheric pressures. The envelope 8 is formed at the end thereof opposite its pressed seal 10 with an exhaust tip 26 left by the tipping off of a glass exhaust tubulation on the envelope after the evacuation and filling thereof through the exhaust tubulation with the combustion supporting gas filling. Different ignition means are known for this type flashlamp such as percussive ignition achieved by striking a hammer blow against a readily deformable metal ignition tube containing the percussively ignitable primer or fulminating material with said ignition tube being sealed into the lamp envelope.

The above photoflash array 2 is provided with a customary base 28 made of a suitable plastic material for mounting the device on a camera. The base 28 includes a platform support portion 30 of substantially square shape, with its edges bowed outwardly a slight amount, on which platform the orthagonally arranged array of reflectors 4 rests. The platform support 30 has a plurality of apertures through which the lead-in wires 14-16 of the respective flashlamps in the array extend to the underside where they are bent around an annular contact ring or collar 32 integral with and depending from the underside of the platform support to form the electrical contacts 14', 16', for the individual flashlamps of the array. The base 28 is also formed with a center post 34 depending from the underside of the platform support 30 and terminating in a plurality of radially outward extending retaining lugs 36 adapted to engage with locking or clamping means in the flashcube-receiving socket of a camera to retain the flashcube in place in the socket. The light-transmitting cover or shield 38 of a single molded piece of the butadiene styrene copolymer material as above described and of substantially cubic shape is disposed over the array of flashlamp reflector assemblies to provide protection from possibly rupturing flashlamps in the array as well as to prevent direct touching of the lamps while they are still in their highly heated condition immediately following the flashing thereof. The cover 38 is permanently affixed at its bottom edge to the platform support 30 by suitable means as, for example, by an adhesive, heat sealing, ultrasonic welding, or a mechanical snap.

To more definitively establish the greater effectiveness of the present plastic cover means to provide protection from flying debris if a flashlamp shatters upon flashing then does a conventional polystyrene plastic cover, comparative tests were conducted utilizing magicube type flashlamp arrays as above described. Special lots of these magicube arrays were tested wherein a single flashlamp of the four lamp arrays was not coated with the protective lacquer coating conventionally empolyed to help prevent shattering of the lamp glass envelope. When tested in this manner, a lot of 39 magicube arrays utilizing the conventional polystyrene covers resulted in five ruptures of the array covers when the unlacuered lamps were flashed. By comparison, a lot of 40 magicube arrays which utilize the butadiene styrene copolymer covers produced no rupture when the unlacquered lamps were flashed. An analysis of these ruptures found that the cover face on the polystyrene covers had split open in front of the lamp allowing glass fragments to escape from the array. The cover face splits occurred approximately in the center of the cover face and the crack extended from the base-cover junction to the cover top. It is apparent from these tests that a butadiene styrene copolymer cover on a magicube array provides greater protection from flying debris when a lamp shatters than does a polystyrene cover on the same array.

Figure 2:
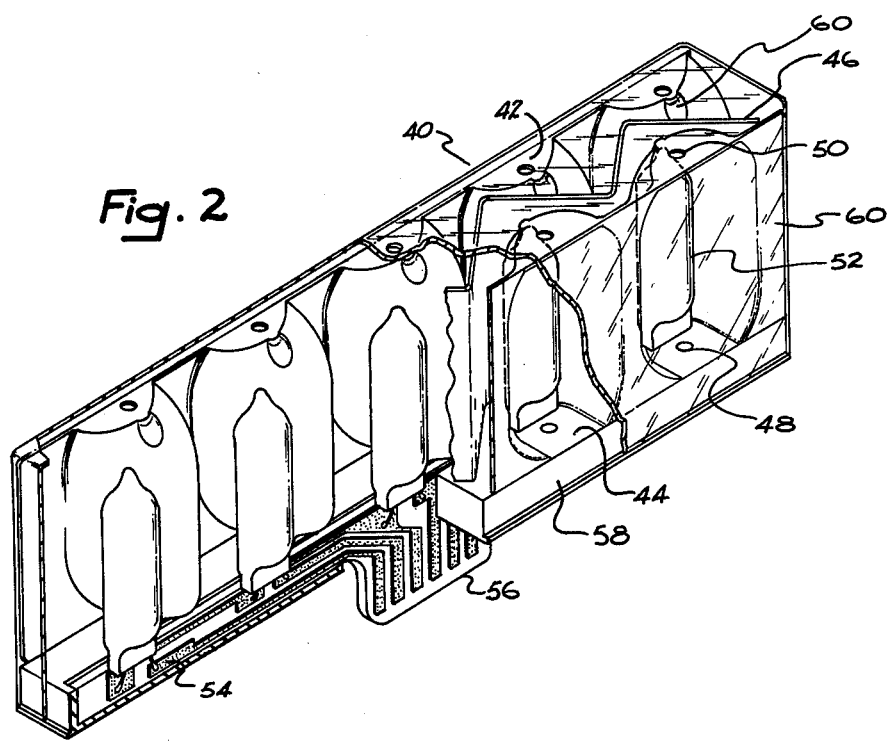
FIG. 2 is a schematic view partly in section of a multilamp photoflash array of the planar type with lamp reflector units and linear rows facing in opposite directions with the reflectors of each row nested into the reflectors of the opposite row.

In FIG. 2 there is shown a schematic view partly in section of an assembled two-sided planar lamp array 40 constituting one of the preferred embodiments of the invention. Reflectors for each of the lamps have been inserted in place with the reflectors for the rearward facing group all formed from one sheet of material 42 such as aluminized plastic. The forward facing reflectors of this two-sided array are formed from one sheet of similar material 44. Preferably, a sheet of insulating material 46 such as asbestos paper or other heat-resistant material is placed in a zig-zag fashion between the nested backs of the reflectors of groups 42 and 44. An air gap or other thermal barrier could serve a function similar to that of the asbestos sheet. Also, vent means are provided such as the openings 48 and 50 in the bottom and top walls of each lamp chamber to carry air convection currents past each lamp 52 when it is flashed to cool it and its reflector. The vent means could be provided in the space between the two reflector rows 42 and 44. The effect of both the insulating means 46 and the vents 48 and 50 is to minimize or essentially prevent distortion of the adjacent reflectors in the same row or in the opposite row upon the flashing of one lamp. In this particular lamp configuration, the individual flashlamps are electrically connected to a printed circuit board member 54 with electrical contact being made to the camera by a contact tab 56 which readily plugs into a suitable receiving socket on the camera itself or on an adaptor thereto. The flashlamp array further includes a base member 58 and a light-transmitting protective cover 60 of butadiene styrene copolymer material. Base 58 can be formed in one or more pieces with suitable recesses and holding means provided in it to hold upright the circuit board member 54. Locating indentations 60 formed in the top region of each individual lamp reflector also aids in holding the lamps upright in this particular array.

To further establish the greater safety of the present cover means compared with polystyrene covers in the above type array construction, special flashlamps were constructed which had been doped with sugar to induce a more violent rupture than is ordinarily encountered when the lamps are flashed. Specifically, 10 milligrams of sugar was incorporated into one flashlamp per array for a flashing test upon three lots of 100 arrays each. One lot utilized the butadiene styrene copolymer cover while the remaining two lots utilized polystyrene covers. One of the styrene cover lots further employed a commercial biaxially oriented polypropylene protective tape adhesively bonded to the covers to further help contain the debris produced upon lamp rupture. When the standard polystyrene cover lot was flashed, it was found that 53 arrays produced lamp rupture with a noise greater than 120 decibels and which further included 28 arrays in which both glass and plastic particles were thrown from the arrays. Flashing of the standard polystyrene cover lot having the protective tape again found 53 lamps rupturing at a noise level greater than 120 decibels, but only two arrays in which both glass and plastic were thrown. Flash tests upon the butadiene styrene copolymer covers resulted in 55 lamp ruptures with a noise level greater than 120 decibels along with only one array in which both glass and plastic left the array. It would appear from the foregoing tests that the improved covers of the present invention provide more product safety in containing the debris from lamp rupture than conventional polystyrene covers without necessitating any additional production step and expense of protecting the cover with a tape wrap.

Figure 3:
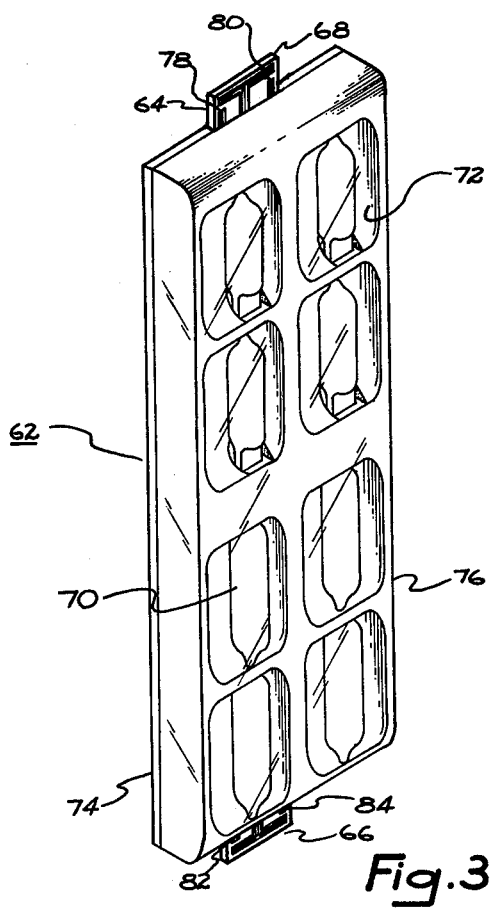
FIG. 3 is a front view of a different planar type multilamp photoflash array utilizing the plastic cover means of the present invention wherein a series of reflectors having photoflash lamps mounted therein facing the same direction to form a single-sided array.

Still a different preferred embodiment of the present invention in the form of a single-side planar photoflash array is shown in FIG. 3. More particularly, the lamp array 62 is shaped as a shallow and compact elongated rectangular body configuration. Electrical connector terminals are provided at the tabs 64' and 66' of a circuit board member 68 which are operatively associated with sequencing electrical circuitry to flash the individual flashlamps as more fully disclosed in the aforementioned application, Ser. No. 448,671. Each of the flashlamps 70 is electrically connected to the underlying circuit board member to fire in a particular sequence with a common reflector member 72 providing additional support means for the individual flashlamps. A conventional base 74 is secured to a light-transmitting cover member 76 of butadiene styrene copolymer material to provide a unitary assembly of the components in this particular array. Tab 64 is provided with a pair of electrical terminals 78 and 80 and tab 66' is provided with a pair of terminals 82' and 84' to enable flashing of the individual flashlamps in proper sequence when actuated with a high voltage pulse.

As is well recognized by persons skilled in the flashlamp and photography arts, the herein disclosed cover means must permit light transmission from the enclosed flashlamps in a balanced spectrum to satisfy the spectral response needs of the color films now in use. More particularly, these photographic color films require approximately the same spectral response for all three component emulsions used in the film. To achieve such desirable response, it is also common to incorporate a dye in the cover material as a color-correcting filter which enhances the photographic quality of the light emerging from the protective cover means. Those skilled in the photoflash lamp art know, therefore, that in order for a polymer material to have desirable transmission characteristics, and which may have to be modulated by suitable dye incorporation thereby requiring compatibility of the polymer, its Spectral Distribution Index "SDI" at 5,500° K daylight is substantially weighted to achieve nearly the same spectral response for all three component emulsions of the color film. Color film reponse is negligible below 360 nm (nanometers) and above 680 nm. The critical range for the polymer material itself falls between 360 nm to 480 nm so that a suitable material should transmit at least 70% of the incident radiation at 375 nm wavelength and at least 80% at the 400 nm wavelength in the 20-30 mil thickness range being employed in the above preferred embodiments. Accordingly, the improved cover means of the present invention meets the foregoing optical transmission requirements in addition to providing better protection against shattering when the enclosed lamps are flashed.

It will be apparent from the foregoing description that various other embodiments and modifications of the present invention will be apparent to persons skilled in the art. For example, the improved cover means of the present invention is believed as useful to provide greater product safety with multilamp photoflash arrays of other designs than herein specifically described. Thus, it is contemplated that an electrical circuit board member of sufficient rigidity could itself provide the base member of a planar lamp array utilizing operatively associated sequencing circuitry. It is intended, therefore, to limit the present invention only by the scope of the following claims.

What we claim as new and desire to secure by Letters Patent of the United States is:

1. A multilamp photoflash array comprising a base, a reflector unit mounted on said base having a plurality of outwardly facing reflectors, a plurality of photoflash lamps mounted on said base, each one of said lamps being positioned within a respective one of said reflectors, and protective cover means over the said reflectors and secured to said base constituted of a light-transmitting polymodal resinous branched block butadiene styrene copolymer containing from about 70–95 weight percent styrene, wherein the copolymer has a Vicat softening of approximately 200° F, a 90–95% light-transmission, and Izod impact strength of about 0.4 foot-pounds/inch notch, a modulus of elasticity of 200,000 psi, and a 100% elongation at a tensile pull rate of approximately 0.2 inches/minute.

2. A multilamp photoflash array comprising four photoflash lamps with associated flashlamp reflector assemblies being mounted adjacent to one another with adjacent devices being mounted at right angles to each other and with their reflectors facing outwardly to form four sides of a cube, a platform base of substantially square shape supporting said flashlamp reflector assemblies, and light-transmitting cover means of substantially cubic shape secured to said base wherein said protective cover means is constituted of a polymodal resinous branched block copolymer of butadiene styrene containing from about 70–95 weight percent styrene, said copolymer having a Vicat softening point of approximately 200° F, a 90–95% light-transmission, an Izod impact strength of about 0.4 foot-pounds/inch notch, a modulus of elasticity of about 200,000 psi, and a 100% elongation at a tensile pull rate of about 0.2 inches/minute.

3. A multilamp photoflash array comprising a base, a reflector unit mounted on said base having a plurality of outwardly facing reflectors in a linear row arranged in side-by-side relationship and facing outwardly in the same direction, a plurality of photoflash lamps mounted on said base with each one of said lamps being positioned within a respective one of said reflectors, and protective cover means over the said reflectors constituted of a light-transmitting polymodal resinous branched block copolymer of butadiene styrene containing from about 70–95 weight percent styrene wherein the copolymer has a Vicat softening point of approximately 200° F, a 90–95% light-transmission, an Izod impact strength of about 0.4 foot-pounds/inch notch, a modulus of elasticity of about 200,000 psi, and a 100% elongation at a tensile pull rate of about 0.2 inches/minute.

4. A multilamp photoflash array comprising a base, a reflector unit mounted on said base having a plurality of outwardly facing reflectors comprising two rows of reflectors arranged back-to-back and facing outwardly in opposite directions, a plurality of photoflash lamps mounted on said base, each one of said lamps being positioned within a respective one of said reflectors, and protective cover means over the said reflectors constituted of a light-transmitting polymodal resinous branched block copolymer of butadiene styrene containing from about 70–95 weight percent styrene, wherein the copolymer has a Vicat softening point of approximately 200° F, a 90–95% light-transmission, an Izod impact strength of about 0.4 foot-pounds/inch notch, a modulus of elasticity of about 200,000 psi, and a 100% elongation at a tensile pull rate of about 0.2 inches/minute.

* * * * *